May 27, 1941.  E. C. DITZEN  2,243,311
FILTER
Filed April 23, 1938  5 Sheets-Sheet 1
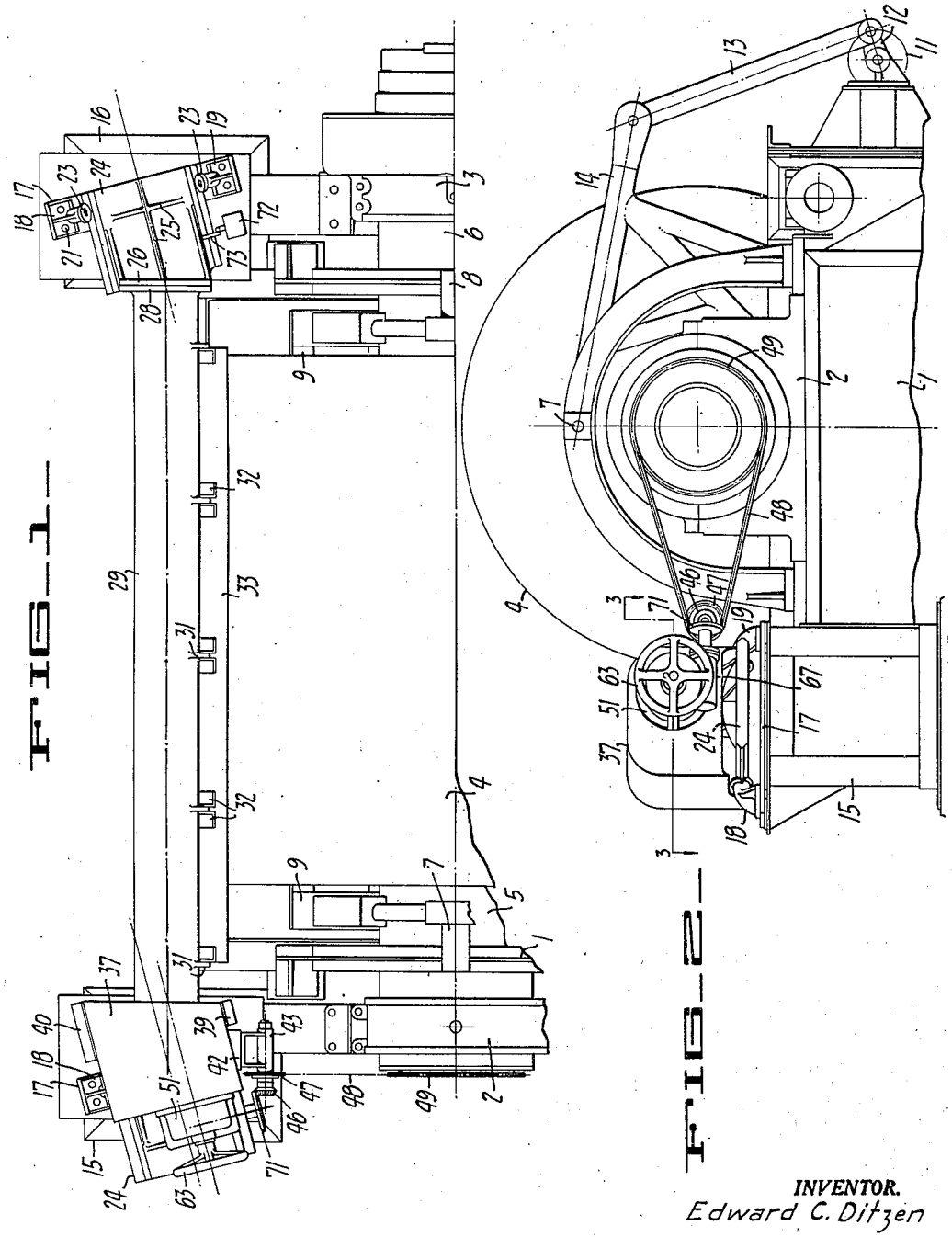
INVENTOR.
Edward C. Ditzen
BY
ATTORNEY May 27, 1941. E. C. DITZEN 2,243,311
FILTER
Filed April 23, 1938 5 Sheets-Sheet 2
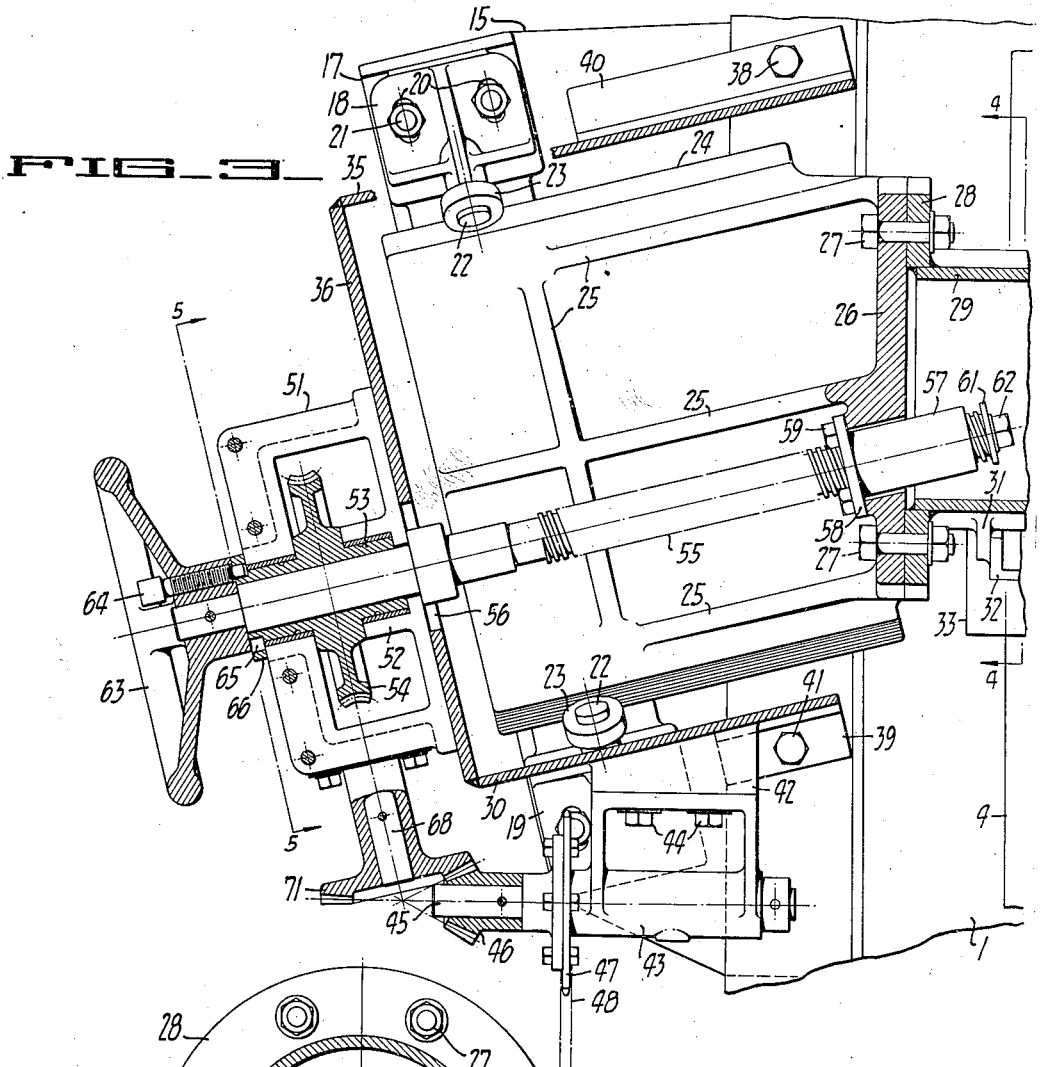
FIG_3_
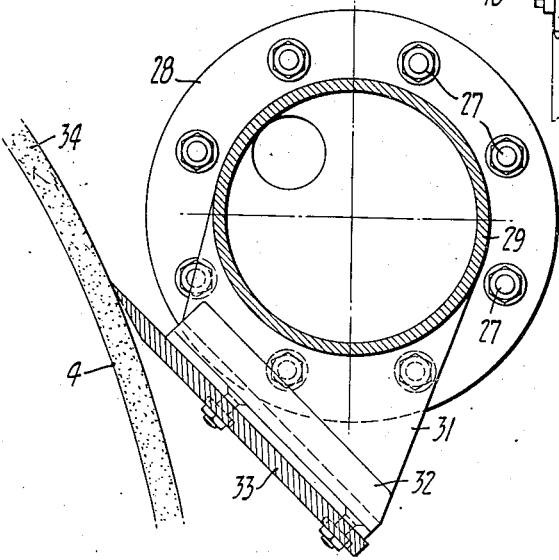
FIG_4_
INVENTOR.
Edward C. Ditzen
BY
ATTORNEY May 27, 1941.  E. C. DITZEN  2,243,311
FILTER
Filed April 23, 1938   5 Sheets-Sheet 3
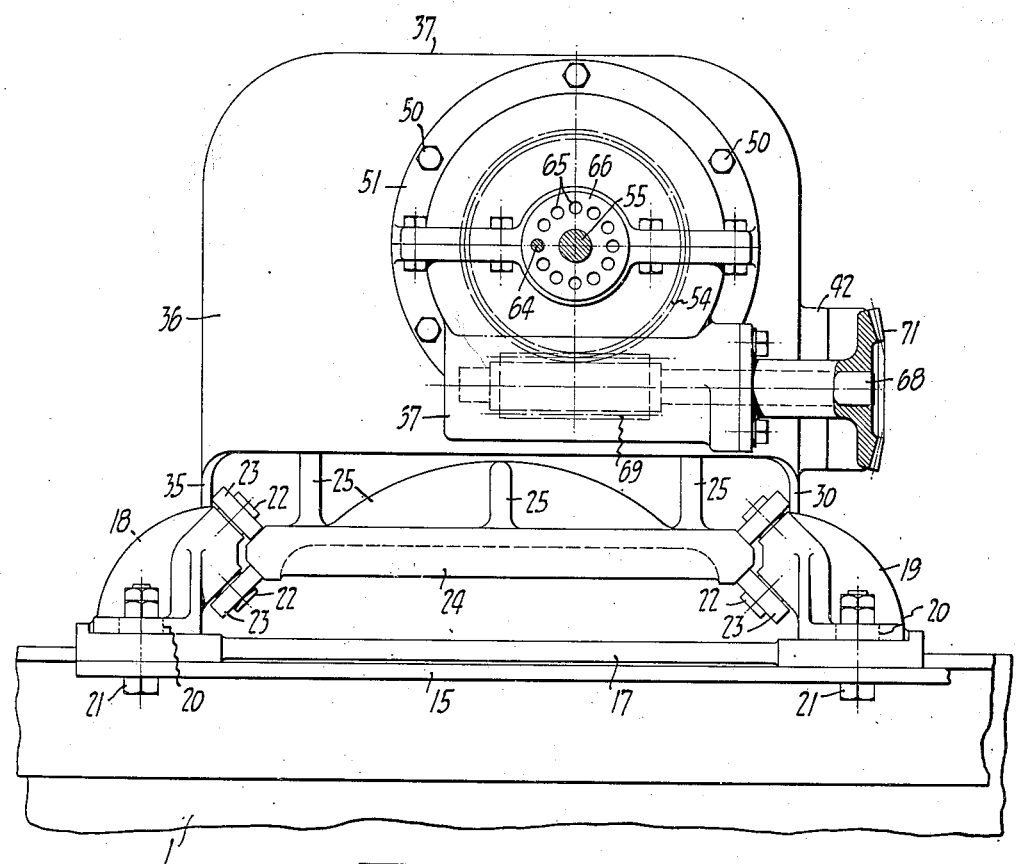
FIG_5_
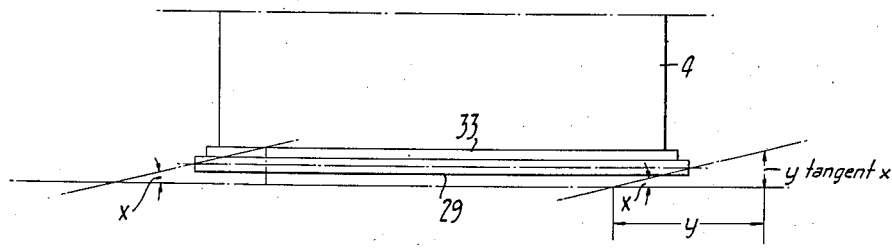
FIG_6_
INVENTOR.
Edward C. Ditzen
BY
ATTORNEY May 27, 1941. E. C. DITZEN 2,243,311
FILTER
Filed April 23, 1938 5 Sheets-Sheet 4
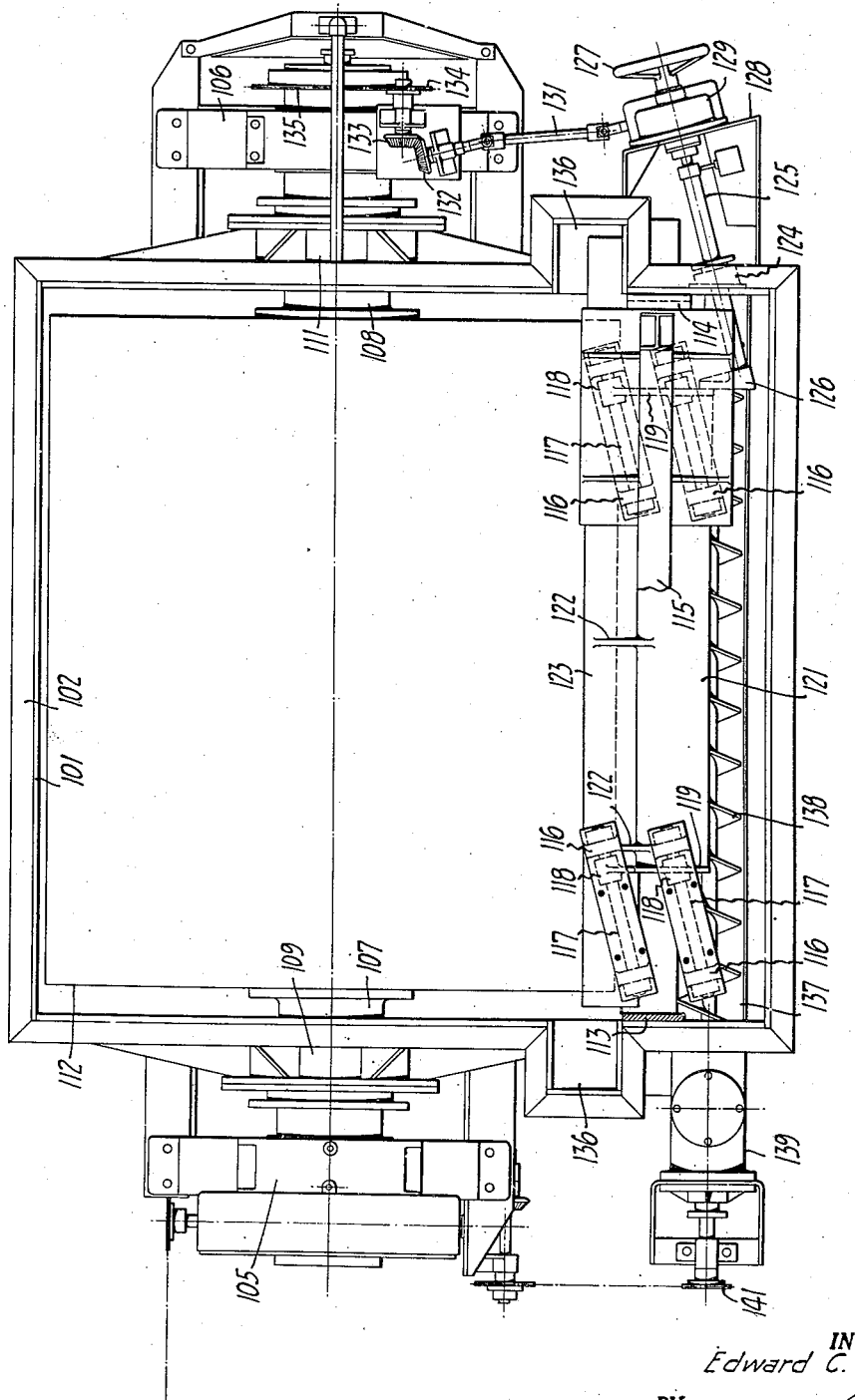
INVENTOR.
Edward C. Ditzen
BY
ATTORNEY

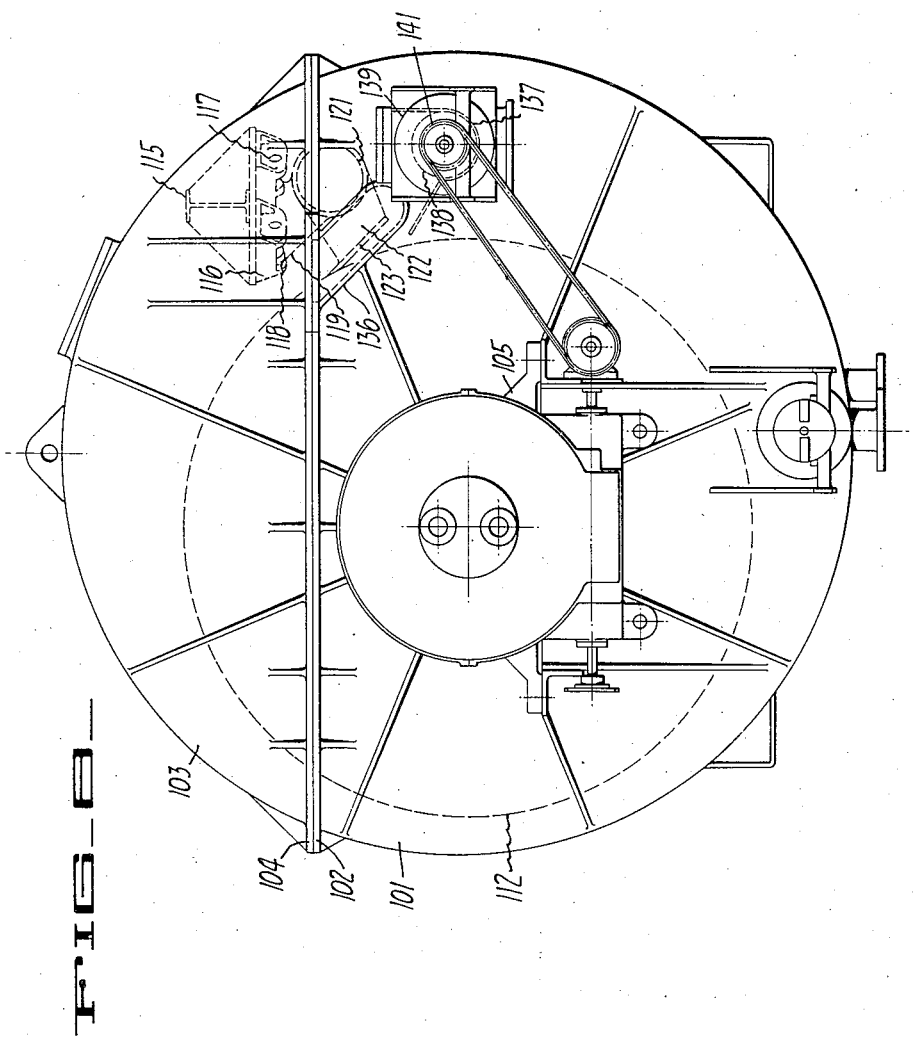

Patented May 27, 1941

2,243,311

UNITED STATES PATENT OFFICE 2,243,311

FILTER

Edward C. Ditzen, San Leandro, Calif., assignor to Oliver United Filters Incorporated, San Francisco, Calif., a corporation of Nevada Application April 23, 1938, Serial No. 203,854

8 Claims. (Cl. 210—201)

This invention relates in general to filters and in particular to that type of filter wherein the filtering medium consists of a layer of comminuted filtering material, the outer surface of which is periodically or continuously shaved off in order periodically or continuously to present a fresh filtering surface.

This principle of operation has been disclosed in the Wieneke Patent No. 2,083,887 of June 15, 1937, with particular reference to a continuous rotary drum filter.

This type of filter is particularly advantageous for the filtration of very finely divided materials, referred to in the Wieneke patent as material of "colloidal" size, and which are ordinarily incapable of filtration on a commercial scale for the reason that they plug or clog the filter medium customarily used. The use of a layer of comminuted filtering material such as diatomaceous earth not only increases the cost of operation but unfortunately leaves the solid material being filtered incorporated with the diatomaceous earth. It is therefore necessary, in using this so-called precoat method of filtration, to use only as much filtering material as is absolutely necessary, and this appears to be dependent upon the mechanism utilized for advancing the discharge knife into the layer of filtering material. In some instances a cut of not more than several thousandths of an inch can be tolerated.

In the past the knives utilized in filters of this character have been advanced by means of screws driven by a motor through suitable reduction gears, worm gears, and pinions. The play in these members has resulted in a back lash of the knive, which must first be taken up before the knife can perform any useful function.

In general, the object of my invention is the provision, in combination with a precoat filter of any type, of economic means for continuously or periodically advancing the discharge knife into the precoat material with a minimum amount of back lash.

More specifically, the object of my invention is the provision, in combination with a precoat filter, of a discharge knife which may be simultaneously moved perpendicularly as well as longitudinally.

The invention possesses other advantageous features, some of which with the foregoing will be set forth at length in the following description where those forms of the invention which have been selected for illustration in the drawings accompanying and forming a part of the present specification are outlined in full. In said drawings, two forms of the invention have been shown, but it is to be understood that it is not limited to such forms, since the invention as set forth in the claims may be embodied in many other forms.

Figure 1 is a partial top plan view of a continuous rotary drum filter embodying the objects of my invention.

Figure 2 is a left end elevation of the filter shown in Figure 1.

Figure 3 is a section taken on the line 3—3 of Figure 2.

Figure 4 is a section taken on the line 4—4 of Figure 3.

Figure 5 is a section taken on the line 5—5 of Figure 3.

Figure 6 is a diagrammatic illustration of the compound longitudinal and perpendicular movement imparted to the discharge knife of a precoat filter.

Figure 7 is a top plan view of a vapor tight continuous rotary drum filter embodying the objects of my invention, with its cover removed in order more clearly to disclose its construction and operation.

Figure 8 is a left end elevation of the filter shown in Figure 7.

As shown in Figures 1 to 6, inclusive, the objects of my invention have been embodied in a continuous rotary drum vacuum filter comprising a tank 1 provided at either end with bearings 2 and 3. Disposed within the tank 1 is a filter drum 4 supported at either end by trunnions 5 and 6 journaled in the bearings 2 and 3. Journaled on pins 7 and 8 secured to the tank 1 is an agitator 9 arranged to swing within the lower portion of the tank beneath the drum 4 for maintaining the solids contained in the sludge to be filtered in a state of suspension. Oscillation of the agitator 9 is effected by a motor driven gear 11 through a crank 12, connecting rod 13, and lever 14.

Formed as an integral part of the tank 1 or rigidly secured thereto at either end thereof on the discharge side of the drum are brackets or pedestals 15 and 16. The upper faces of the pedestals 15 and 16 are machined and support sub-bases 17 having machined faces. Seated on either end of each of the sub-bases 17 are brackets 18 and 19 provided with slotted openings 20 adapted to register with slotted openings formed in the sub-bases 17 and the top of the pedestals 15 and 16. The brackets 18 and 19 are adjustably secured to the top of the pedestals 15 and 16 by bolts 21 passing through these slots. Journaled on pins 22 secured to each of the brackets 18 at right angles with respect to each other are roller bearings 23 on which is seated a carriage 24. It is to be noted that the brackets 18 and 19 and their associated roller bearings 23 constitute a guide member for the carriage 24. The guide members so formed and secured to each of the pedestals 15 and 16 lie in a common horizontal plane, and although parallel with each other are disposed at an angle with respect to the periphery and axis of the filter drum 4.

Each of the carriages 24 is cast with suitable stiffening webs 25 and is provided at its inner end with a vertically extending flange 26. Secured to the flange 26 of each of the carriages 24 by bolts 27 is a ring 28 to which is welded a tubular beam 29. The flanges 26 are cast so as to lie at right angles with respect to the periphery and axis of the drum 4 and therefore the tubular beam 29 secured to these flanges is parallel to the periphery of the drum. The tubular beam 29 is formed with inwardly extending lugs 31 to which is secured by clips 32 a discharge knife 33, having its cutting edge extending across and parallel with the periphery of the filter drum 4. The discharge knife 33 is so located with respect to the tubular beam 29 that it lies in a plane substantially tangential to the periphery of the filter drum 4 and the body of the layer of precoat material 34 carried thereon. This relation of parts should be rather strictly observed, for otherwise the knife 33 will not make a clean cut within the required limits. In view of the above construction and as diagrammatically shown in Figure 8, any longitudinal movement of the discharge knife 33 will of necessity be accompanied by a corresponding movement at right angles to the axis of the drum. If, for example, the guide members constituted by the brackets 18 and 19 and their associated roller bearings 23 are disposed at an angle $x$ with respect to the axis of the drum, a longitudinal movement $y$ of the discharge knife 33 will of necessity be accompanied by a right angular movement equal to $y$ tangent $x$. Or, expressed in another way, the perpendicular movement of the discharge knife is equal to the diagonal movement of the carriage 24 multiplied by the sine of the angle $x$. This mechanism therefore may be considered as a speed reducer free from the play and back lash which invariably results from the use of gears and worms.

Enclosing the carriage 24 supported on the left end pedestal 15 is a housing comprising vertical side members 30 and 35 to which is welded a vertical end plate 36 and a cover 37 (see Figures 1 and 3). The housing so formed is anchored to the pedestal 15 on one side by means of an angle 40 welded to the vertical wall 35 and bolted by a bolt 38 to the pedestal; the opposite vertical wall 30 of the housing is welded to an angle 39 bolted to the pedestal by a bolt 41. Welded to and extending outwardly from the vertical wall 30 is a bracket 42 to which is secured a bearing 43 by bolts 44. Journaled in the bearing 43 is a shaft 45 to which is keyed a bevel pinion 46 and a sprocket 47 adapted to be driven by a chain 48 in mesh with a sprocket 49 carried by the trunnion 5. Bolted to the vertical end plate 36 by bolts 50 is a split bearing housing 51 within which is formed a bearing 52, and journaled in this bearing is a sleeve 53 formed with a worm gear 54. Journaled within the sleeve 53 is a screw 55 passing through an aperture 56 formed in the vertical end member 36. The inner end of the screw 55 has threaded engagement with a sleeve 57 having a flange 58 secured by bolts 59 to the upwardly extending flange 26 of the carriage 24. To limit the outward movement of the sleeve 57 a washer 61 is secured thereto by a bolt 62. Keyed to the outer end of the screw 55 is a hand wheel 63 provided with a pin 64 adapted to be engaged in any one of a number of holes 65 formed in the flange 66 of the sleeve 53. It is to be particularly noted that the worm gear 54 will drive the screw 55 only if and when the pin 64 is in engagement with one of the holes 65.

The bearing housing 51 is also provided with a bearing 67 at right angles to the bearing 52 and within which is journaled a shaft 68, formed on its inner end with a worm 69 in mesh with the worm gear 54, and keyed at its outer end to a beveled gear 71 in mesh with the pinion 46.

Mounted on the pedestal 16 is a limit switch 72 arranged to be tripped by a pin 73 secured to its associated carriage 24 for the purpose of breaking the circuit of the motor driving the filter when the discharge knife 33 has shaved or turned off substantially all of the precoat material carried on the periphery of the drum.

The general construction and operation of the rotary drum filter with which the discharge knife feeding mechanism is arranged to cooperate may be of any standard construction such as manufactured and sold by Oliver United Filters, Inc. and therefore need not be further described herein.

The operation of a filter equipped with a discharge knife advancing mechanism as above described is as follows:

The discharge knife 33 is first backed away from the drum as far as possible. This is done by disengaging the pin 64 from the flange 66 of the sleeve 53 and then rotating the hand wheel 63 in a counter-clockwise direction as viewed in Figure 2. The counter-clockwise rotation of the hand wheel causes the carriage 24 to move upwardly to the right as viewed in Figure 1 and consequently the discharge knife 33 is given a compound motion parallel to the axis of the drum and perpendicularly away therefrom. The surface of the filter drum 4 is then precoated with a body or layer of filtering material such as diatomaceous earth by rotating the drum within a slurry of the precoat material contained in the filter tank, under the influence of a differential filtering pressure. The layer of filtering material so deposited on the filter drum may vary anywhere from one to three inches in thickness, depending upon the nature of the material to be filtered.

After this layer of precoat material has been deposited on the periphery of the filter drum, the filter tank is emptied of all remaining filter material slurry and is filled to the desired level in the usual manner with the sludge to be filtered. This having been done, the discharge knife 33 is advanced toward the drum by rotating the hand wheel 63 in a clockwise direction until the knife just clears the body of precoat material carried on the drum. The gear 54 is locked to the screw 55 by engaging the pin 64 with the next adjacent hole 65 carried by the flange 66. The circuit of the motor driving the drum is then closed, whereupon the drum starts to rotate within the slurry contained in the filter tank and the discharge knife 33 by means of the sprocket 49, chain 38, sprocket 47, pinion 46, beveled gear 71, gear 54, screw 55, threaded sleeve 57, and guide members constituted by the brackets 18 and 19 and their associated roller bearings 23, is made continuously to advance into the layer of precoat, thereby to shave or turn off the slime deposited on the precoat under the action of a differential pressure, together with a layer or film of the precoat in the order of two thousandths of an inch in thickness. The operation of the filter in this manner normally progresses until the limit switch 72 is tripped by the pin 73. The remaining thin layer of precoat material may then be blown from the drum by the application of a reverse pressure within the drum, and the cycle of operation repeated as above described.

The same principle of advancing the discharge knife along diagonally disposed guide members has been shown in Figures 7 and 8 as applied to a pressure or vapor tight rotary drum filter. As shown in these figures the filter comprises a tank 101 having a flange 102 surrounding its upper periphery and a cover 103 provided with a flange 104 adapted to register with the flange 102. The cover 103 may be sealed against the tank 101 by a gasket disposed between the flanges 102 and 104. Secured to the ends of the tank 101 are bearings 105 and 106 for rotatably supporting trunnions 107 and 108, the inner ends of which pass through stuffing boxes 109 and 111 and are secured to the ends of a filter drum 112. The general construction and operation of the filter as above described is in accordance with standard practice and therefore it is deemed unnecessary further to describe the details of construction of the filter per se. Welded within the tank 101 at either end of its discharge side are brackets 113 and 114 and supported by these brackets is a beam 115 extending longitudinally of the filter drum 112 and parallel to its axis. Depending from the beam 115 at either end thereof are diagonally disposed lugs 116 to which are secured two pairs of parallel diagonally disposed pins 117 which insofar as function is concerned may be considered the equivalent of the guide members constituted by the brackets 18 and 19 and their associated roller bearings 23 of the knife advancing mechanism shown in Figures 1 to 6, inclusive. Slidably disposed on the pins 117 are sleeves 118 formed integral with depending plates 119. Secured to and within the plates 119 is a tubular beam 121 provided with webs 122 which in turn are secured to a discharge knife 123.

Extending through a stuffing box 124 secured to one end of the tank 101 at the discharge side thereof is a screw 125 having threaded engagement at its inner end with a bracket 126 secured to the right hand depending plate 119, and keyed at its outer end to a hand wheel 127. Welded to the tank 101 about the screw 125 is a bracket 128 to which is secured a bearing housing 129 similar in all respects to the bearing housing 51 as shown in Figures 1, 2, 3, and 5, and provided with the same type of mechanism for driving the screw 125. The screw 125 may therefore be rotated either by the hand wheel 127 or by the gears associated with the bearing housing 129 through a universal joint 131, beveled gears 132 and 133, sprocket 134, and sprocket 135 secured to the trunnion 108.

Since the advance of the discharge knife 123 depends upon its longitudinal movement, the discharge knife 123 must of necessity be longer than the filter drum 112, and for this reason the tank 101 is provided at either end with pockets 136 adapted to receive the ends of the discharge knife.

For the purpose of removing the cuttings of cake and precoat material produced by the discharge knife 123, a trough 137 is secured within the discharge side of the tank 101 immediately beneath the lower end of the discharge knife 123. Disposed within this trough is a discharge scroll 138 extending through a tube 139 secured to the tank and driven by a gear 141. The gear 141 may in turn be driven in any suitable manner through gears associated with the trunnion 107.

The operation of the device shown in Figures 7 and 8 is identical with the operation of the device shown in Figures 1 to 6 inclusive, with the exception that the tank is made vapor tight and therefore a super-atmospheric pressure may be used to effect filtration. It is to be particularly noted, however, that the operation of the discharge knife 123 is effected through a single stuffing box 124, and that the entire discharge mechanism, being rigidly secured to the tank, is definitely fixed with respect to the periphery and axis of the drum 112.

Both modifications of the invention as shown in Figures 1 to 8 inclusive, have the advantage over constructions previously used in that the diagonally disposed guide members for the discharge knives constitute in themselves a speed reducer devoid of any back lash whatsoever. Furthermore, due to the diagonal disposition of the guide members for the discharge knives, the movement of the discharge knives in a direction perpendicular to the axis of the drum is only a fraction of the longitudinal movement of the knives, conconsequently any slack or back lash resulting from the driving mechanism (gears, sprocket wheels, chains, etc.) external to the tank will be imparted to the discharge knives only as the ratio between the movement of the knives in a direction perpendicular to the axis of the drum and their corresponding longitudinal movement.

Obviously, the use of the discharge knife advancing mechanism embodying the objects of this invention is not limited to sectionalized rotary drum filters of conventional type, but may be resorted to with equal advantage in connection with any type of filter wherein the actual filter medium consists of a body or layer of comminuted filtering material and where it is desired continuously or periodically to cut or shave off its outer surface so as continuously or periodically to present a fresh filtering surface. For example, the filtering medium supporting member, instead of being movably as in a rotary drum filter, may be stationary and filtration effected by flooding the bed with the material to be filtered. The discharge knife might then be movably mounted above the filtering medium supporting member so as to sweep its surface and thereby shave off a layer of the filtering material. For the purpose of this specification it will be deemed that relative motion between the discharge knife and the filtering medium supporting member, regardless of which of these two members actually does the moving, will cause the locus of the knife to generate a surface substantially parallel with the surface of the filtering medium supporting member. In other words, the discharge knife capable of only a limited movement toward the filter drum of a continuous rotary drum filter may be considered, due to the movement of the drum, as developing or generating with respect to the drum a surface which is substantially parallel thereto. In this connection it is to be noted that the advance of the discharge knives into the precoat need not be continuous, for by disengaging the pin 64 carried by the hand wheel 63 as shown in Figure 3, the gear 54 is disengaged from the screw 55.

Although for purposes of illustration an automatic, hand controlled mechanism for either periodically or continuously advancing the discharge knife into the body or layer of precoat material has been shown, obviously the periodic operation of the device may be made entirely automatic by resorting to suitably designed cams or interrupted gears.

I claim:

1. A filter comprising: a supporting member; a layer of comminuted filtering material carried on said supporting member; a knife supported adjacent said layer of filtering material with its cutting edge parallel thereto; and means for imparting to said knife a movement which has a component parallel to the cutting edge of the knife and a component perpendicular to said cutting edge and toward said filtering material so as to bring said knife into cutting relation therewith.

2. A filter comprising: a filtering medium supporting member; a discharge knife disposed adjacent said member with its cutting edge parallel to the surface of said member; means for producing relative motion between said member and said knife such that the locus of the knife with respect to said member generates a surface substantially parallel with the surface of said member; and means for imparting to said knife a movement which has a component parallel to the cutting edge of the knife and a component perpendicular to said cutting edge and toward said filtering material so as to bring said knife into cutting relation therewith.

3. A filter comprising: a supporting member; a layer of comminuted filtering material carried on said supporting member; means for applying a differential filtering pressure to said filtering material; a knife supported adjacent said layer of filtering material with its cutting edge parallel thereto; and means for imparting to said knife a movement which has a component parallel to the cutting edge of the knife and a component perpendicular to said cutting edge and toward said filtering material so as to bring said knife into cutting relation therewith.

4. A filter comprising: a tank; a filter drum arranged to rotate within said tank; a body of comminuted filtering material carried on the surface of said drum; a knife mounted adjacent and parallel to said drum; and means for imparting to said knife a movement which has a component parallel to the cutting edge of the knife and a component perpendicular to said cutting edge and toward said filtering material so as to bring said knife into cutting relation therewith.

5. A filter comprising: a pervious supporting member; a layer of comminuted filtering material carried on said supporting member; spaced parallel guide members secured adjacent said supporting member; a knife arranged to move along said guide members with its cutting edge parallel with said supporting member, said guide members being diagonally disposed with respect to said cutting edge; and means for moving said knife along said guide members.

6. A filter comprising: a pervious supporting member; a layer of comminuted filtering material carried on said supporting member; spaced parallel guide members secured adjacent said supporting member; a knife arranged to move along said guide members with its cutting edge parallel with said supporting member, said guide members being diagonally disposed with respect to said cutting edge; and a motor driven screw for moving said knife along said guide members.

7. A filter comprising: a tank; a filter drum arranged to rotate within said tank; a body of comminuted filtering material carried on the surface of said drum; stationary guide members secured adjacent the periphery of said drum, said guide members being parallel to each other and diagonally disposed with respect to the axis of said drum; a knife associated with said guide members and extending longitudinally of and parallel with the surface of said drum; and means for advancing said knife along said guide members.

8. A filter comprising: a supporting member; a layer of comminuted filtering material carried on said supporting member; a knife movably supported adjacent said layer of filtering material with its cutting edge parallel thereto; means for imparting to said knife a movement which has a component parallel to the cutting edge of the knife and a component perpendicular to said cutting edge; and means for maintaining said cutting edge parallel with said supporting member during said movement.

EDWARD C. DITZEN.